(12) United States Patent  
Tzeng et al.

(10) Patent No.: US 7,954,586 B2
(45) Date of Patent: Jun. 7, 2011

(54) ATV ENGINE POWER OUTPUT CONVERSION MECHANISM

(75) Inventors: Wen Ru Tzeng, Tainan Hsien (TW); Weily Chen, Tainan Hsien (TW); Huei-Huay Huang, Tainan Hsien (TW)

(73) Assignee: Aeon Motor Co., Ltd., Tainan Hsien (TW)

( * ) Notice: Subject to any disclaimer, the term of this patent is extended or adjusted under 35 U.S.C. 154(b) by 324 days.

(21) Appl. No.: 12/385,108

(22) Filed: Mar. 31, 2009

(65) Prior Publication Data
US 2009/0188741 A1    Jul. 30, 2009

(51) Int. Cl.
*B60K 17/354*    (2006.01)
(52) U.S. Cl. .......... 180/247; 180/248; 180/233; 74/417; 74/423; 74/424
(58) Field of Classification Search .................. 180/247, 180/248, 233
See application file for complete search history.

(56) References Cited

U.S. PATENT DOCUMENTS

| | | | |
|---|---|---|---|
| 6,892,845 B2 * | 5/2005 | Handa | 180/233 |
| 6,896,085 B2 * | 5/2005 | Terada | 180/245 |
| 6,896,087 B2 * | 5/2005 | Korenjak et al. | 180/292 |
| 6,935,452 B2 * | 8/2005 | Goto et al. | 180/233 |
| 6,962,226 B2 * | 11/2005 | Goto et al. | 180/233 |
| 7,168,518 B2 * | 1/2007 | Ima | 180/248 |
| 7,309,301 B2 * | 12/2007 | Janson et al. | 475/200 |
| 7,665,564 B2 * | 2/2010 | Smith et al. | 180/233 |
| 7,896,120 B2 * | 3/2011 | Mochizuki et al. | 180/247 |

\* cited by examiner

*Primary Examiner* — Paul N Dickson
*Assistant Examiner* — Marlon A Arce
(74) *Attorney, Agent, or Firm* — Bacon & Thomas, PLLC

(57) ABSTRACT

Disclosed is an all-terrain vehicle (ATV) engine power output conversion mechanism, which is characterized primarily by linking a first transmission assembly to the output terminal of the engine, where the central shaft of the first transmission assembly is provided with a first gear at its one end which connects to the output terminal of the engine, while the other end of the central shaft to a first bevel gear; having a second transmission assembly, where its central shaft is provided with a second bevel gear at its one end which gears to the first bevel gear, while the other end of the central shaft to a second gear, and the central shaft is joined to the rear wheel axle to drive the rear wheels; having a third transmission assembly, where its central shaft is provided with a third gear which gears to the second gear, and the third gear gears to a reduction gear, where the output terminal of the reduction gear is used to drive the front wheels; and having a switch set up at the handle bar of the ATV or wherever the rider can reach, where the switch is for the control of the reduction gear to drive the front wheel. Through such setup, the ATVs are capable of selecting a two-wheel drive or a four-wheel drive, subject to the demand upon various terrain conditions.

1 Claim, 4 Drawing Sheets

ATV ENGINE POWER OUTPUT CONVERSION MECHANISM

BACKGROUND OF THE INVENTION

1. Field of the Invention

This invention relates generally to an all-terrain vehicle engine power output conversion mechanism and more particularly to one that features a selection of a two-wheel drive or a four-wheel drive subject to the demand upon various terrain conditions.

2. Description of the Prior Art

All-terrain vehicles (ATVs) quite often move on rugged landforms or demonstrate vehicle performance; therefore, they exceedingly call for mighty horsepower output. The engine power of the conventional ATVs is employed either in a two-wheel drive (2WD) or a four-wheel drive (4WD). The 2WD ATVs are particularly appropriate to the smooth passages. And their engines fatigue easily once they move on the jagged terrains. On the other hand, the 4WD ATVs are quite sufficient to the jagged terrains for their engines, yet somehow, they consume considerable amount of fuel and are fairly improper once simply riding on the smooth passages.

SUMMARY OF THE INVENTION

In the light of the aforesaid drawbacks, this inventor conceived deeply the idea for the design of the invention, and eventually the longtime endeavors gave birth to this invention.

The objective of the present invention is to provide an all-terrain vehicle (ATV) engine power output conversion mechanism, which features a simple structure that enables the ATVs to pick out a two-wheel drive (2WD) or a four-wheel drive (4WD), subject to the demand upon various terrain conditions.

To achieve the aforesaid objective, the present invention is characterized primarily by linking a first transmission assembly to its output terminal of the engine, where the central shaft of the first transmission assembly is provided with a first gear at its one end which connects to the output terminal of the engine, while the other end of the central shaft to a first bevel gear; having a second transmission assembly, where its central shaft is provided with a second bevel gear at its one end which gears to the first bevel gear, while the other end of the central shaft to a second gear, and the central shaft is joined to the rear wheel axle to drive the rear wheel; having a third transmission assembly, where its central shaft is provided with a third gear which gears to the second gear, and the third gear gears to a reduction gear, where the output terminal of the reduction gear is used to drive the front wheel; and having a switch set up at the handle bar of the ATV or wherever the rider can reach, where the switch is for the control of the reduction gear to drive the front wheel or not. Through such setup, the ATVs are capable of selecting a 2WD or a 4WD, subject to the demand upon various terrain conditions.

DETAILED DESCRIPTION OF THE INVENTION

To achieve the foregoing objects of the present invention, the techniques adopted and the achievable function are detailed described with reference to the following preferred exemplified embodiment and the accompanying drawings for a thorough comprehension.

Figure 1:
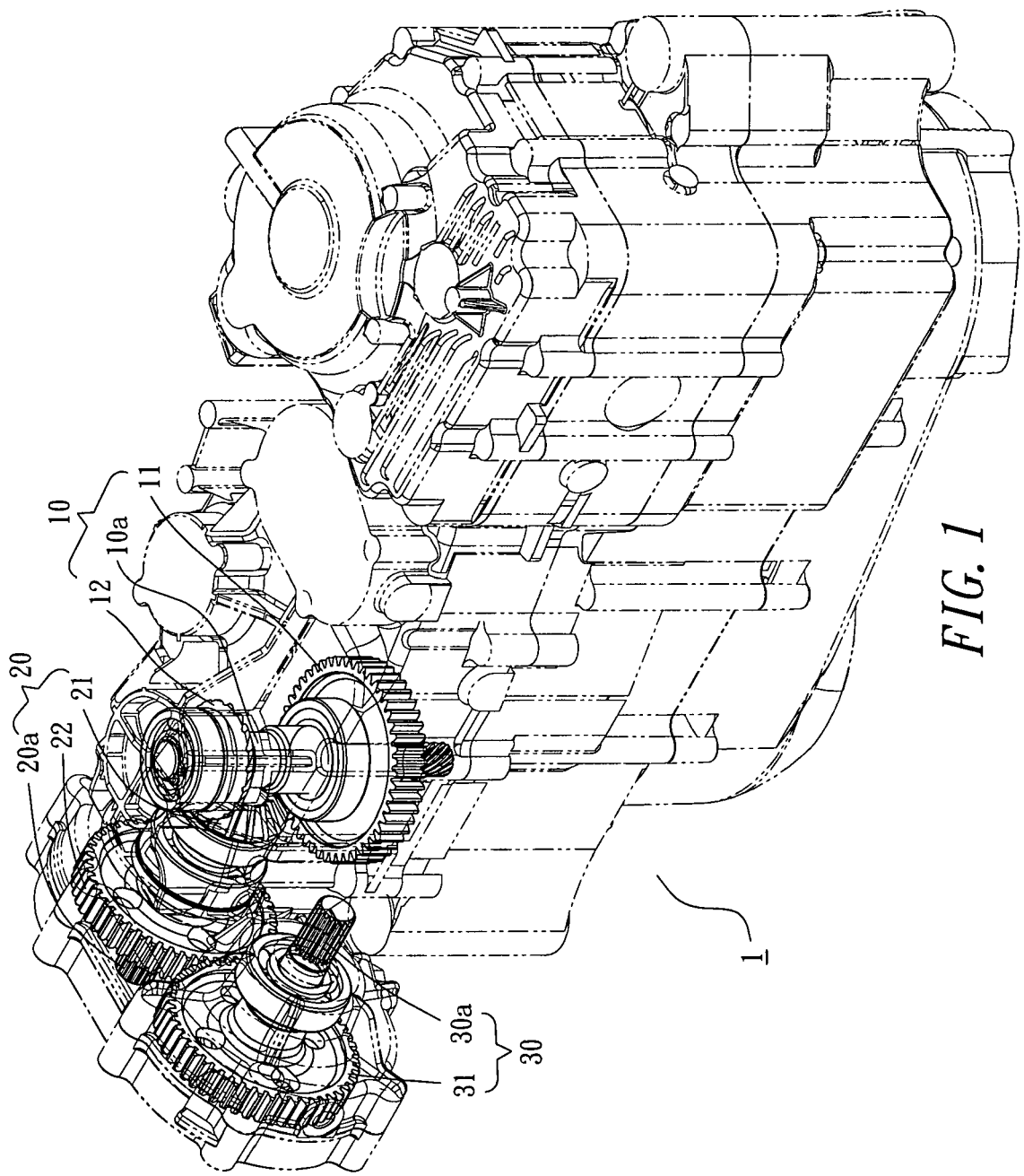
FIG. 1 is a three-dimensional assembled view depicting the preferred embodiment of the present invention.
Figure 2:
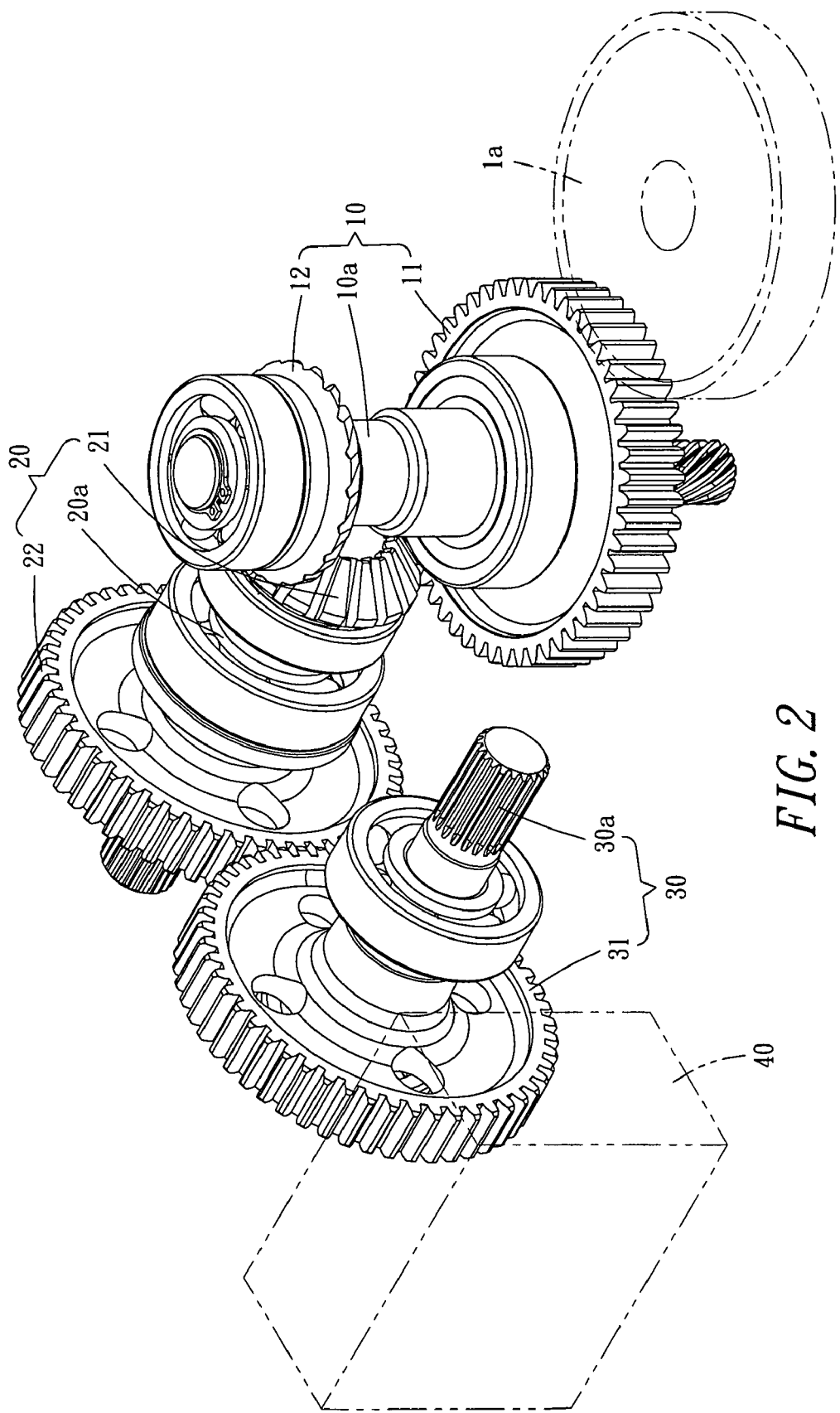
FIG. 2 is a three-dimensional view depicting the lack of engine for the preferred embodiment of the present invention.
Figure 3:
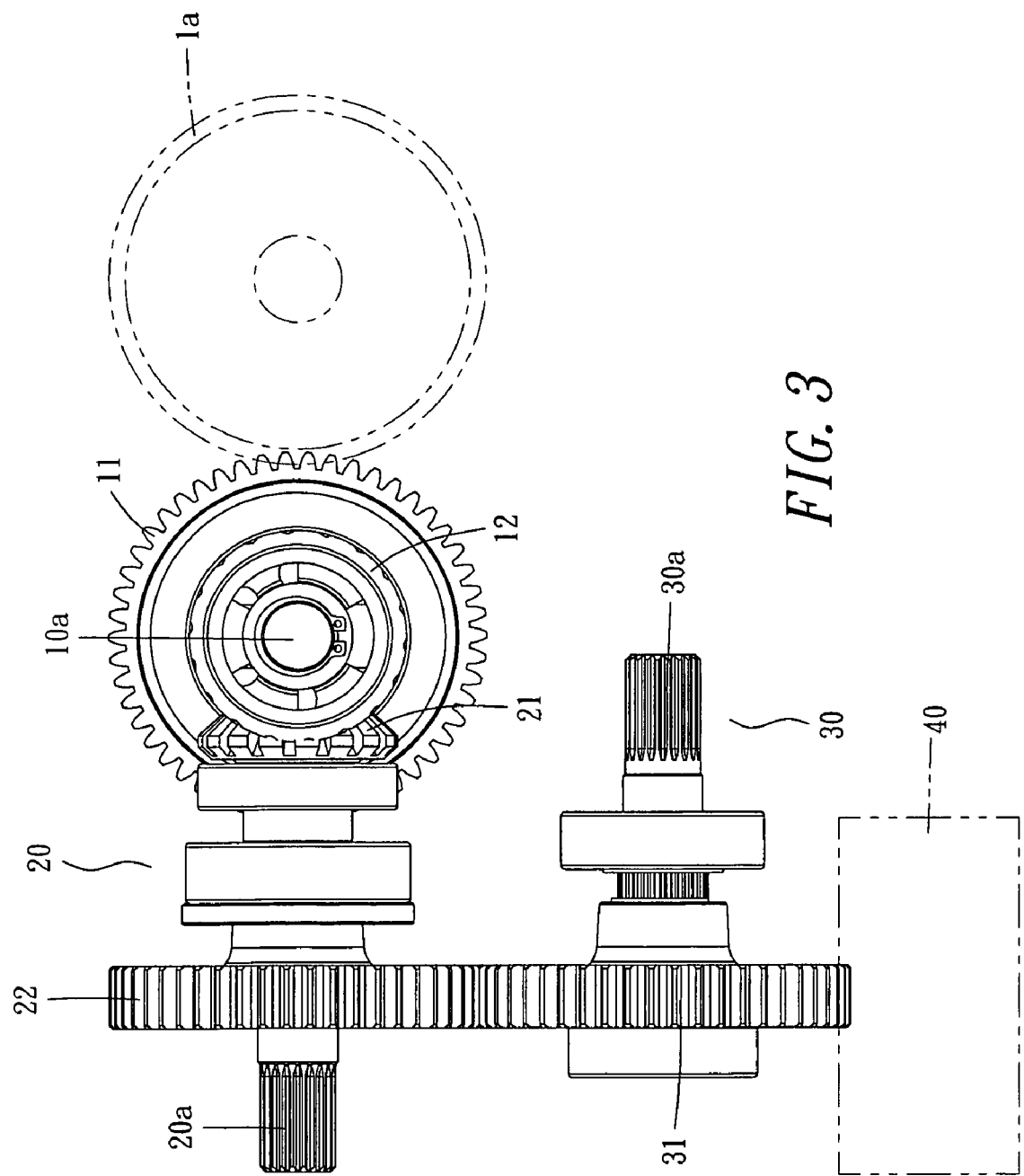
FIG. 3 is a top view depicting the lack of engine for the preferred embodiment of the present invention.
Figure 4:
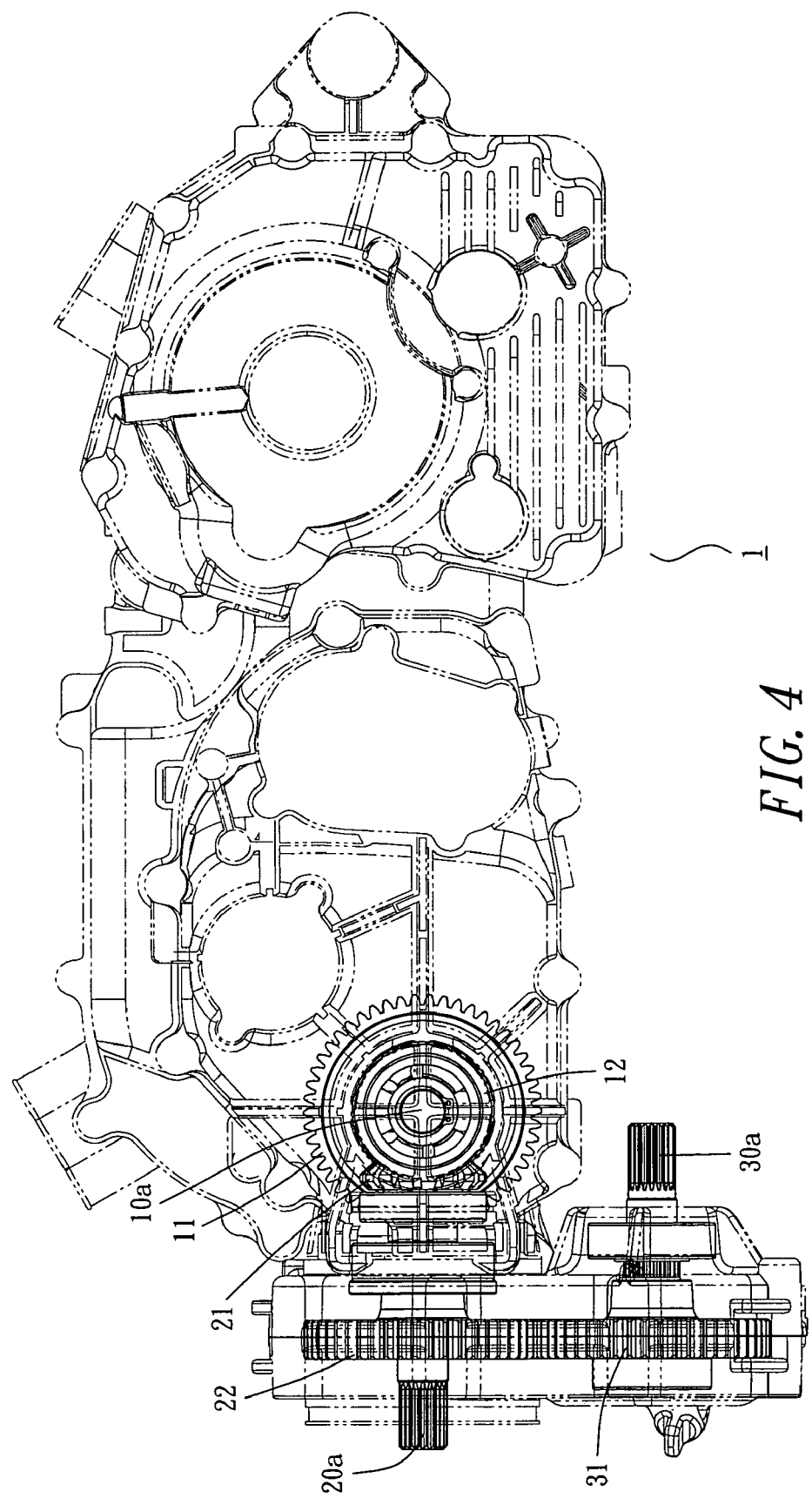
FIG. 4 is a top view depicting the preferred embodiment of the present invention.

Referring to FIGS. 1-3, this invention comprises: an engine 1, where the output terminal 1a of the engine 1 connects to a first transmission assembly 10. The central shaft 10a of the first transmission assembly 10 is provided with a first gear 11 at its one end which connects to the output terminal 1a of the engine 1, while the other end to a first bevel gear 12;

a second transmission assembly 20, where its central shaft 20a is provided with a second bevel gear 21 at its one end which gears to the first bevel gear 11, while the other end of the central shaft 20a to a second gear 22, and the central shaft 20a is joined to the rear wheel axle to drive the rear wheel;

a third transmission assembly 30, where its central shaft 30a is provided with a third gear 31 which gears to the second gear 22, and the third gear 31 gears to a reduction gear 40 (shown in FIGS. 2 & 3), where the output terminal of the reduction gear 40 is used to drive the front wheel. And there is a switch (not shown in the figures) set up at the handle bar of the ATV or wherever the rider can reach, where the switch is for the control of the reduction gear 40 to drive the front wheel or not;

Referring to FIGS. 2-4, the present invention has the following operating steps: the rider ignites the engine 1→the output terminal 1a of the engine 1 drives the first gear 11 of the first transmission assembly 10 to rotate→the first gear 11 drives the first bevel gear 12 on the same shaft to rotate→the first bevel gear 12 drives the second bevel gear 21 of the second transmission assembly 20 to rotate →the second bevel gear 21 drives the second gear 22 on the same shaft to rotate, meanwhile, the central shaft 20a drives the rear wheel to rotate→the second gear 22 drives the third gear 31 of the third transmission assembly 30→the third gear 31 drives the reduction gear 40 to rotate (not yet to drive the front wheel)→the rider presses the 4WD switch down→the reduction gear 40 drives the front wheel (means to switch from 2WD to 4WD). Once the 4WD is no more in need, a press on the 4WD switch into OFF, which means a conversion to the 2WD. The above structure makes the ATVs available for selecting a 2WD or a 4WD, subject to the demand upon various terrain conditions, which is construed to be useful and inventive than the prior art.

To sum up, the present invention is not only creative and novel, but useful and practical, which is fully in compliance with the requirements of invention patentability, thereby filing the present application herein subject to the patent law.

What is claimed is:

1. An all-terrain vehicle (ATV) engine power output conversion mechanism, comprising:

a.) a first transmission assembly, connecting to the output terminal of the engine, where its central shaft of said first transmission assembly is provided with a first gear at its one end which connects to the output terminal of the engine, while the other end to a first bevel gear;

b.) a second transmission assembly, where its central shaft is provided with a second bevel gear at its one end which gears to the first bevel gear, while the other end of the central shaft to a second gear, and the central shaft being joined to the rear wheel axle to drive the rear wheels to rotate;

c.) a third transmission assembly, where its central shaft is provided with a third gear which gears to the second gear, and the third gear gearing to a reduction gear, where the output terminal of the reduction gear is used to drive the front wheels; and a switch being set up at the handle bar of the ATV or wherever the rider can reach, where the switch is for the control of the reduction gear to drive the front wheels.

* * * * *